Dec. 26, 1933. LE ROY O. EDWARDS 1,940,907
FISH LURE
Filed July 1, 1933
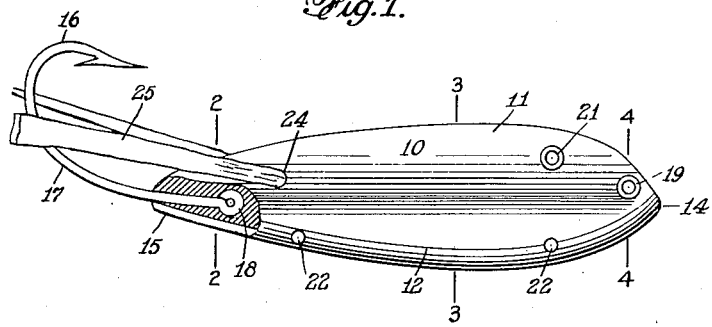
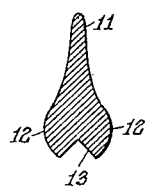
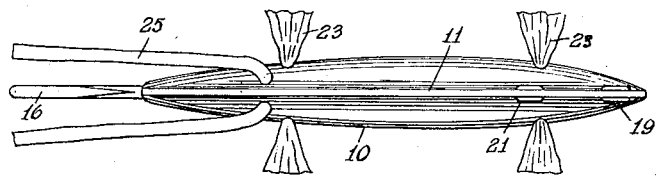
INVENTOR
LE ROY O. EDWARDS
BY
ATTORNEY Patented Dec. 26, 1933

1,940,907

UNITED STATES PATENT OFFICE 1,940,907

FISH LURE

Le Roy Osborn Edwards, East Hampton, N. Y.

Application July 1, 1933. Serial No. 678,553

5 Claims. (Cl. 43—42)

This invention relates to fish lures and more particularly to artificial bait or lures adapted for trolling or casting and of the type generally designated as "wabblers," since they pass through the water in a series of erratic movements similar to the natural movements of a fish.

Among the objects of this invention are; to provide a lure of the above type which is cheap and simple to construct, which does not deteriorate due to the action of the water, which may be used with or without bait, which is adapted to be used for various sizes of fish, which maintains a position similar to that of a swimming fish and which does not become entangled in weeds, stones, or other obstructions.

Although the novel features which are believed to be charactistic of this invention will be pointed out more particularly in the claims appended hereto, the invention itself, as its objects and advantages, and the manner of its application will be better understood by referring to the following description taken in connection with the accompanying drawing, in the various figures of which similar parts have been identified by like reference characters.

In the drawing:

Fig. 1 is a side elevation, partially in section, of a fish lure constructed in accordance with the present invention, Fig. 2 is a section taken on the line 2—2, of Fig. 1, Fig. 3 is a section taken on the line 3—3, of Fig. 1, Fig. 4 is a section taken on the line 4—4, of Fig. 1, Fig. 5 is a top plan view of the fish lure showing the artificial fins and bait in place, Fig. 6 is an elevation of the fish lure showing one position thereof with respect to the line, and Fig. 7 is an elevation of the fish lure, similar to Fig. 6, showing the same in a different position with respect to the line.

Referring to the drawing more in detail, the invention is shown as comprising a fish lure having a body 10 of general fish shape with an upstanding longitudinal flange 11, increasing in width downwardly to form a pair of lateral ribs 12 on either side thereof, which are of substantial width and are so designed as to cause the lower center of gravity of the body 10 to lie in the lower portion thereof, so that the lure will maintain an upright position in its passage through the water.

A recess or groove 13 is formed in the bottom of the body 10 between ribs 12 and extends throughout substantially the entire length of the lure. The body 10 is formed with a blunt nose 14 and with an enlarged intermediate section tapering toward the tail 15. The groove 13 is curved generally from the blunt nose 14 to the tail 15, and is of a shape adapted to engage the water as the lure passes therethrough, preferably V-shaped in cross-section, and to cause the lure to remain in an upright or substantially upright position.

The body portion above described is preferably cast from a suitable metal which has a bright surface and which is not affected by water, for example, an alloy of lead and tin. Various other metals may be employed, however, such as aluminum or stainless steel.

A standard type of hook 16 having a shank 17 and an eye 18, is secured to the body portion 10 of the lure in any suitable manner. Preferably the body portion is cast about the eye 18, and about the adjacent portion of the shank, with the shank extending approximately along ribs 12, and with the hook portion in an upstanding position with respect to the body. When the body portion is cast about the eye 18, the molten metal enters the eye and forms a bond for rigidly and securely holding the hook in the desired position.

The body portion 10 is provided with an eye 19, which is adapted to receive a line 20 (Fig. 7) by which the lure is pulled through the water. The eye 19 is located above the center of gravity of the lure and toward the nose thereof, so that the lure will pull through the water in an upright, or slightly upwardly inclined position, as for example, in casting. The force of the water exerted upon the V-shaped groove 13 assists in maintaining this position.

The body portion 10 may also be provided with an eye 21 which is located somewhat to the rear of the eye 19 and in the upper part of the longitudinal flange 11 and is adapted to receive the line 20, as illustrated in Fig. 6. The position of eye 21 is such that when the lure is pulled through the water by means of a line attached to this eye, the lure assumes a downwardly inclined position which causes it to move downwardly in the water. This particular feature is useful for trolling when it is desired to troll a substantial distance below the surface of the water.

The arrangement of the eyes 19 and 21 with respect to the blunt nose 14 is such that the lure will not catch on obstructions in the water, but will readily free itself and pass around the same. This feature is of importance in preventing the lure from becoming lost when casting or trolling in water containing weeds, stones, or the like.

The lure is also provided with a pair of apertures 22 which extend through the lower part of body 10, preferably through the lateral ribs 12, at points near the front and rear of the body portion corresponding to the location of the fins on a fish. These apertures 22 are adapted to receive artificial fins 23 (Fig. 5) which may comprise, for example, short strips of blue silk which are threaded through said apertures and permitted to extend in a general fan shape on both sides of the body portion 10.

The lure is also provided with an aperture 24, preferably located in flange 11, at a point near the rear of the body portion 10, and adapted to receive bait, such as a strip of pork rind 25, which is preferably cut wedge shaped and is threaded through the aperture 24 and caused to extend on both sides of the body 10 a sufficient distance to partially over-lie the hook 16, whereby it partially conceals the hook and also resembles the tail of a fish.

It is to be understood that the above described lure may be used with or without the artificial fins 23, and with or without the bait 25, depending upon the requirements involved in any particular type of fishing. It is to be noted that the weight of the lateral ribs 12 causes the lure to pass through the water in an upright position, that the flange 11 causes the lure to follow an erratic path through the water, and that the groove 13 cooperates with the water in maintaining the lure in a substantially upright position. The lure, as to its general appearance and as to its movements through the water, accordingly resembles a natural fish. Furthermore, the body portion may be readily cast about a standard hook to provide an integral construction which is durable and strong and is particularly adapted for the purpose involved.

Although certain embodiments of the invention have been disclosed herein for purposes of illustration, it is to be understood that the invention is not to be limited thereto, but is to be limited only in accordance with the following claims when interpreted in view of the prior art.

What is claimed is:

1. A fish lure comprising a body portion of general fish shape, having an upstanding central flange increasing in width downwardly to form a pair of lateral ribs adapted to cause the center of gravity of said body portion to lie at the lower portion thereof, and to maintain said body portion in an upright position in its passage through the water, and a hook integrally secured in said body portion and extending rearwardly and upwardly therefrom, said flange having an aperture at the rear portion thereof adapted to receive the bait in a position to cooperate with said hook to partially conceal the same and to resemble the tail of the fish.

2. A fish lure comprising a hook having a shank and an eye, a body portion of general fish shape cast around said eye and a portion of said shank, said body portion being located in advance of said hook and being adapted to pass through the water in an upright position, said body portion having a blunt nose and an enlarged central section tapering toward the tail thereof, and having an aperture located in said nose and adapted to receive a line, said body portion comprising an upstanding longitudinal flange increasing in width downwardly to form a pair of side ribs at the lower portion thereof, and having a longitudinal groove located at the bottom thereof and extending from the nose to the tail of said body portion between said ribs, said groove being adapted to control the position of said body portion in its passage through the water.

3. A fish lure comprising a hook having a shank and an eye, a body portion of general fish shape cast around said eye and a portion of said shank, said body portion being located in advance of said hook and being adapted to pass through the water in an upright position, said body portion having a blunt nose and an enlarged central section tapering toward the tail thereof, and having an aperture located in said nose and adapted to receive a line, said body portion comprising an upstanding longitudinal flange increasing in width downwardly to form a pair of side ribs at the lower portion thereof, said ribs having a pair of apertures extending therethrough and spaced longitudinally thereof, to receive artificial fins.

4. A fish lure comprising a general fish-shaped body portion, a hook having a shank extending into the rear of said body portion, said body portion being cast about said shank to form an integral structure and having an aperture at the front thereof adapted to receive a line, said body portion being weighted to maintain an upright position and having artificial fins secured thereto, and having a rear aperture adapted to receive bait in a position to cooperate with said hook to partially conceal the same and to resemble the tail of a fish.

5. A fish lure comprising a body of general fish shape having a blunt nose and an enlarged central section tapering toward the tail thereof, said body comprising an upstanding longitudinal flange increasing in width downwardly to form a pair of side ribs separated at the bottom by a longitudinal groove extending from the nose to the tail along the bottom of said body, said ribs being adapted to lower the center of gravity of the body and to distribute the weight longitudinally thereof, and a hook extending rearwardly from said body and having a shank secured in said body, said body having means located at the nose and above the center of gravity thereof adapted to receive a line for causing the body to pass through the water in an upright position similar to a swimming fish and in advance of said hook.

LE ROY OSBORN EDWARDS.